Nov. 24, 1970  H. S. JONES  3,542,556
PHOTOSENSITIVE LENTICULATED FILM WITH SEPARABLE
MULTI-ELEMENT LENS OVERLAY
Filed June 27, 1967  2 Sheets-Sheet 1
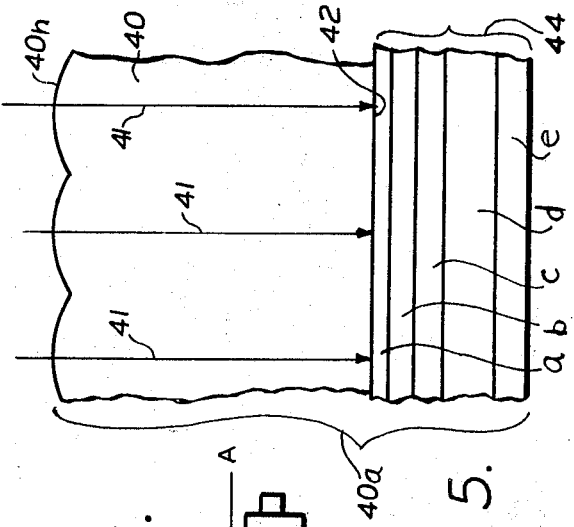
FIG. 5.
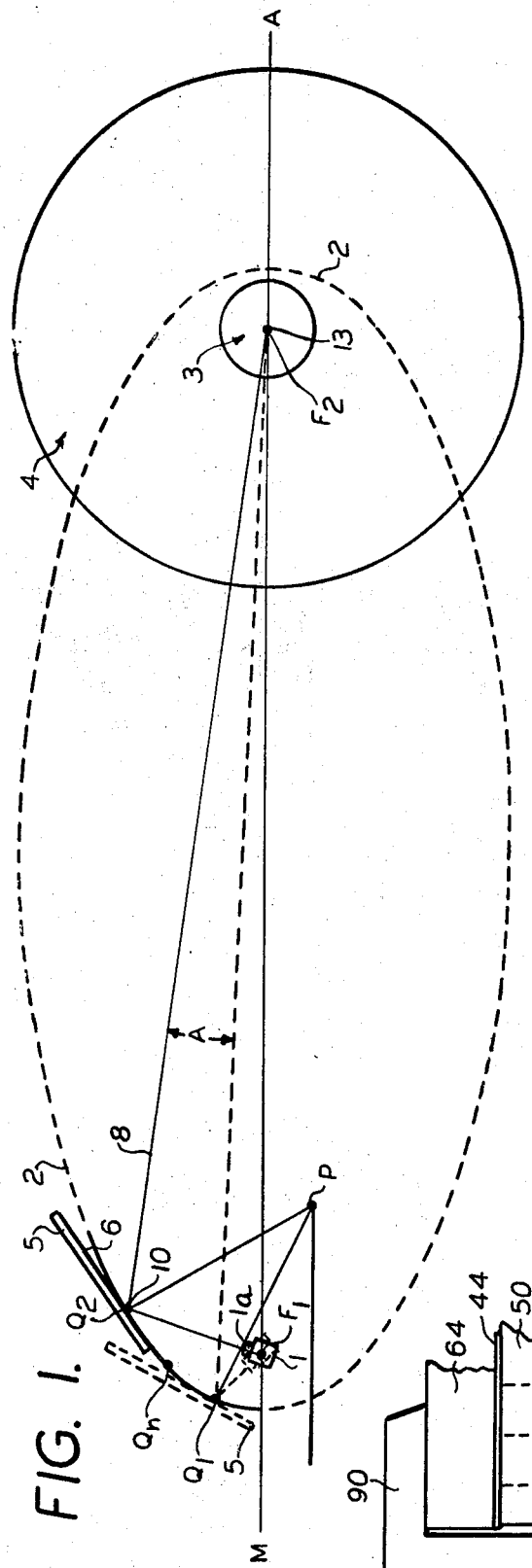
FIG. 1.
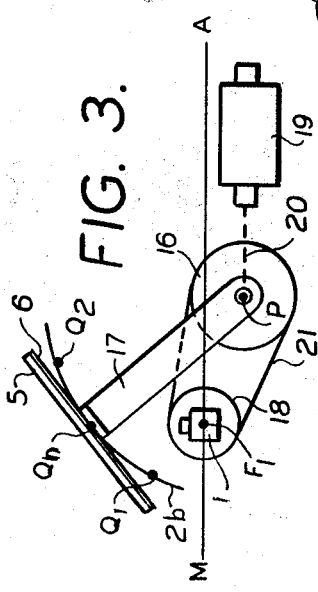
FIG. 3.
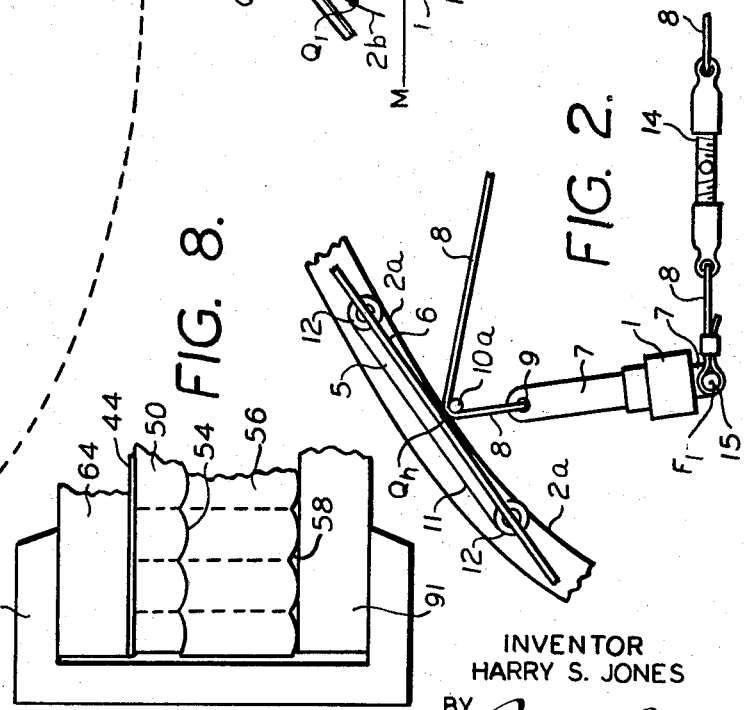
FIG. 8.
FIG. 2.
INVENTOR
HARRY S. JONES
BY
ATTORNEY.

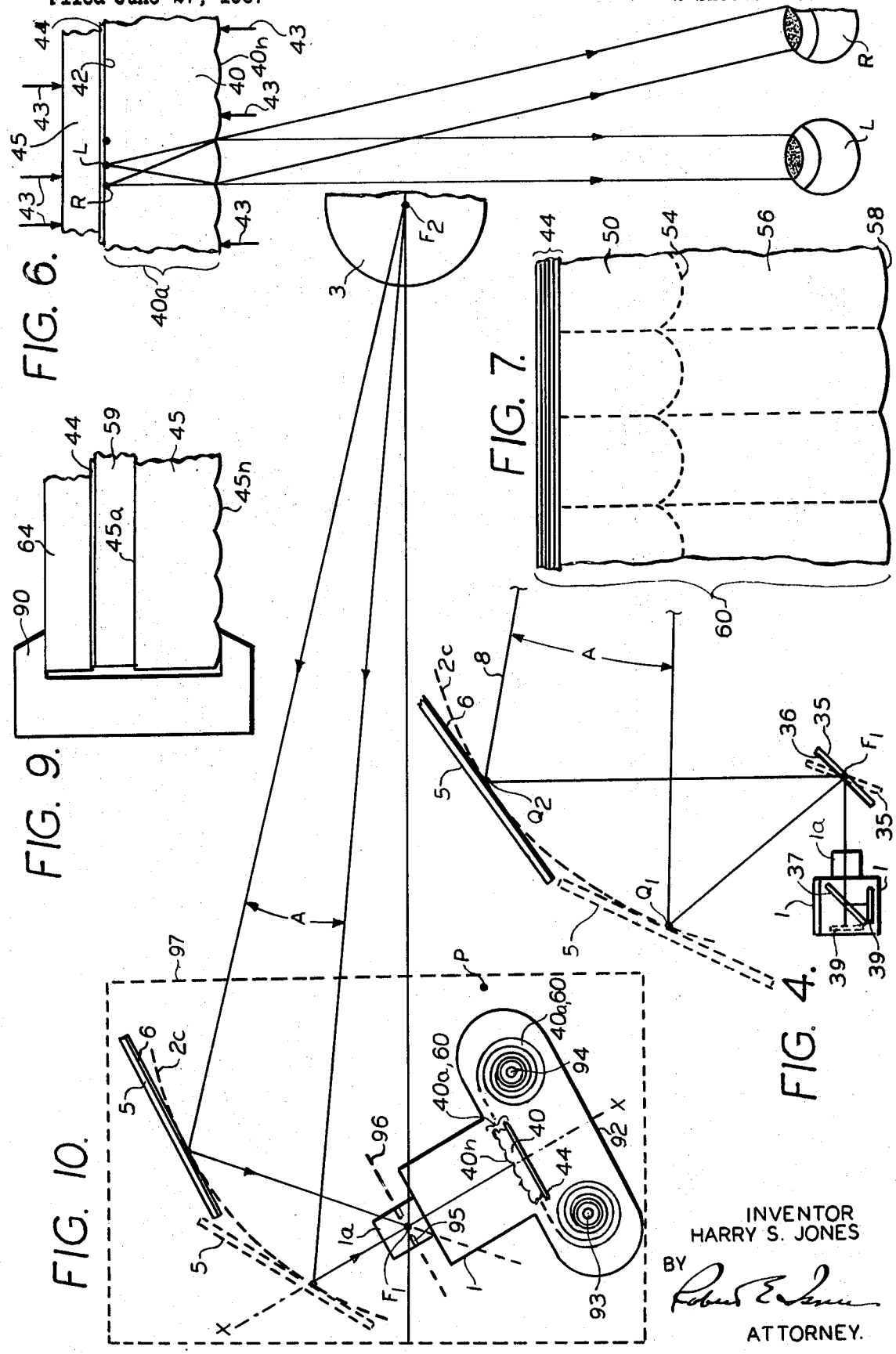

United States Patent Office 3,542,556
Patented Nov. 24, 1970

3,542,556
PHOTOSENSITIVE LENTICULATED FILM WITH SEPARABLE MULTI-ELEMENT LENS OVERLAY
Harry S. Jones, Monmouth Beach, N.J., assignor to Chrom-Tronics, Inc., New York, N.Y., a corporation of New York
Filed June 27, 1967, Ser. No. 649,309
Int. Cl. G03c 1/84, 7/14
U.S. Cl. 96—81               3 Claims

ABSTRACT OF THE DISCLOSURE

Camera apparatus for securing three dimensional photographic images wherein equivalent relative displacement between the subject to be photographed and the camera to effect deposition of a continuous series of images on a photosensitive film through a multiple-element lens overlay adjacent thereto is optically effected by interposition of displaceable light reflecting means intermediate the camera and subject and a photo-sensitive film construction wherein the photosensitive emulsion is integrally superposed on a multi-element lens overlay of selectively variable character.

---

This invention relates to relief photography and more particularly to improved constructions for securing relief photographic images.

The obtaining of relief or three-dimensional images or effects in the photographic arts has, for many years, challenged the skilled workers in this field. While the basic theory and the nature of the problems involved have long been known and understood, the present day dearth of simple, commercially practical and inexpensive relief photographs and methods of obtaining the same cogently demonstrate the continued inability of the art to solve the problems involved.

Included among the known techniques are systems in which the relief effect is essentially obtained by the taking, through a single camera lens of small aperture, of a continuous series of photographs of the subject, as viewed from a continuous series of positions relative to the camera lens and recording the series through an array of very small auxiliary lenses or apertures located adjacent the photographic film plane so that an image of the single lens aperture is focussed upon the film by each of such auxiliary lenses or apertures.

For example, in such systems the continuous series of views is recorded while the film is either moved parallel and relative to the multielement lens array or both the lens array and film are fixed relative to each other and both are titled as an assembly about a vertical axis in the film plane while relative motion between the subject and camera is simultaneously effected during exposure of the film. In addition to the above two methods for recording a continuous series of views, the desired result can be achieved, as described in my copending application Ser. No. 649,306, filed June 27, 1967, by traversing a portion of the camera lens aperture with the film and multi-element lens array held in fixed relation perpendicular to the camera lens axis while relative motion between the camera and subject is simultaneously effected. Such systems, although comprehensively disclosed in the patented art, have not as yet been widely used due to the bulk and complexity of the apparatus necessary to provide the requisite relative movement between the camera and the subject.

This invention may be briefly described as an improved method and apparatus for securing relief photographic images through exposure of a continuous time sequenced series of images and effects the desired unidirectional motion between camera and subject by optical means as by the interposition of reflecting mirror means disposed intermediate the camera lens and the subject displaceable along a path of predetermined curvature conjointly synchronized with the rotative displacement thereof and with rotative displacement of the camera lens. In its more narrow aspects, the subject invention also includes improved three-dimensional film constructions wherein separable lenticulated elements are employed as an emulsion base or carrier during and after exposure to thereby avoid problems of overlay registry and provide improved relief viewing through selective variation of the f number thereof.

Among the advantages of the subject construction is the provision of simple and relatively inexpensive constructions for securing relief photographic images of improved character and an improved film construction to simplify the taking and viewing of relief photographs.

The object of this invention is the provision of an improved apparatus for securing relief photographs.

Another object of this invention is the provision of an improved construction for an image receiving element for relief photography.

A more specific object of this invention is the provision of essentially optical means for obtaining a continuous series of views of a photographic subject from a continuous series of different positions without movement of the subject and with only minimal rotative displacement of the camera during exposure.

Other objects and advantages of this invention will be apparent from the following portions of this specification and from the accompanying drawings which illustrate the principles of this invention as incorporated in exemplary presently preferred embodiments thereof.

Referring to the drawings:

FIG. 1 is a schematic plan view of one assemblage of apparatus elements utilizable in the securing of relief photographic images in accordance with the principles of this invention;

FIG. 2 is a fragmentary view of a portion of the apparatus shown in FIG. 1; and

FIG. 3 is a fragmentary view of a modified form of the apparatus illustrated in FIG. 1.

FIG. 4 is a schematic and fragmentary view of a further modified form of the apparatus illustrated in FIG. 1.

FIG. 5 is an enlarged sectional view of a preferred photosensitive film construction utilizable in the camera apparatus of FIG. 1;

FIG. 6 is a schematic illustration of means for viewing the improved photosensitive film construction of FIG. 5;

FIG. 7 is an enlarged sectional view of a fragment of a modified construction for the photosensitive film that permits selective change of the f/number thereof;

FIG. 8 is a fragmentary sectional view illustrating the incorporation of the film of FIG. 7, in modified form, in a holder assembly.

FIG. 9 is a fragmentary sectional view of the incorporation of a further modification of the construction illustrated in FIG. 7 in a holder assembly; and FIG. 10 is a schematic plan view of a portable assembly utilizable in the securing of relief photographs in accordance with the principles of this invention.

In accordance with the principles of this invention, the optical equivalent of the required relative motion between the subject and camera for the taking of a continuous series of views of the subject from a cotninuous series of different positions is provided by selective displacement of a mirror element disposed in the optical path between the subject and the camera. More specifically, this latter is effected by providing a selected degree of rotative displacement of such a mirror element conjointly with displacement thereof along a predetermined path in association with concurrent rotational displacement of the camera in conjunction therewith.

Referring now to the drawings and in particular to FIG. 1, there is illustrated the essentials of a presently preferred construction incorporating a plane mirror interposed in the optical path between a camera 1 of the type heretofore described and including a multi-element lens overlay disposed closely adjacent a photosensitive film and subject. As there set forth and with additional reference to FIGS. 2 and 3, any type of three dimensional or relief camera assembly 1 incorporating a vertically-oriented lens array and of the type requiring relative motion between itself and the subject to be photographed for the exposure of relief photographs, is selectively located so that it may be rotated about a vertical axis disposed coincident with one focus $F_1$ of the ellipse 2 The center of interest 3 of an over-all subject area, generally designated by the circle 4, is selectively located at the second focus $F_2$ disposed on the major axis (MA) of the ellipse 2. A plane mirror 5 is mounted on a suitable platform adapted to be displaced along the defining boundary of the ellipse 2 in such manner as to maintain its reflective surface 6 tangent to the ellipse 2 at all points $Q_n$ that are disposed intermediate arbitrary limit points $Q_1$ and $Q_2$ thereon.

As previously noted, camera 1 is mounted and arranged so that, during rotation thereof, its optical axis always passes through a vertical axis disposed coincident with the first focus $F_1$ of the ellipse 20 so that the optical axis of the camera 1 will always extend from focus $F_1$ sequentially through all points $Q_n$, as the mirror 5 is moved along the ellipse between points $Q_1$ and $Q_2$, to the second focus $F_2$.

As is now apparent, the described construction functions to produce the optical equivalent of a rotation of the subject area 4 and sub-area 3 through an angle A about the second focal point $F_2$. Likewise, when greater or lesser distances between the area 3 and the camera 1 are desired, modifications can be readily effected so as to change the ellipse to one having the foci $F_1$ and $F_2$ at greater or lesser distances from each other and concurrently therewith to vary the elliptic configuration from that shown to one approaching a parabola.

As illustrated in more detail in FIGS. 2 and 3, the camera 1 may, when desired, be conveniently mounted upon an elongate plate member 7, one end of which is pivotally mounted at the focus $F_1$ for rotative displacement thereabout. The other end of the plate member 7 is secured, as at 9, to the terminal end of a cable 8. The cable 8 passes over a pulley 10a secured to a dolly 11 or other moveable support for the mirror 5 and having rollers or wheels 12 in contact with a track or guide member 2a conforming to the defining boundary of the ellipse 2. As schematically shown in FIG. 1, the cable 8 further passes around a pin or second pulley 13 having its center disposed coincident with the second focus $F_2$ of the ellipse and is terminally secured, as at 15, to the aforesaid first-mentioned end of plate 7 disposed coincident with the first focus $F_1$, with a turnbuckle 14 being included thereon for tension control purposes.

The above described construction will effectively achieve the desired positional relationship of camera, mirror and subject when the pulleys 10a and 13 and pin 15 and the diameter of the cable 8 are sufficiently small as compared with the distances $F_1Q_1$ and $F_1Q_2$. In use of the subject construction, the optical distance between the camera 1, located with its axis passing through focus $F_1$, and the subject area 3, located adjacent focus $F_2$, will be constant for all angles A for mirror displacement intermediate the limiting points $Q_1$ and $Q_2$. By virtue thereof, the described optical traverse system will thus avoid any changes in the size of the photographic image over the full angle of traverse. Likewise, since $F_1$ and $F_2$ will be fixed for any given installation or operational system, the optical distance $F_1Q_nF_2$ remains a constant for all positions $Q_n$ intermediate limit points $Q_1$ and $Q_2$.

The above-described construction may be effectively simplified without significant loss in essential performance characteristics by utilizing a circular path 2b between points $Q_1$ and $Q_2$ that does not significantly depart from the curvature of the ellipse. FIG. 3 illustrates one such possible simplification of construction. As there shown, the plane mirror 5 is directly attached to a pulley 16 by an elongate intermediate support link 17. The pulley 16 is coupled by a drive belt 21 or by other convenient linking means such as on idler gear to a second pulley 18 having its axis of rotation coincident with focus $F_1$ and on which the camera 1 is mounted. When the first pulley 16 is approximately double the diameter of the second pulley 18, the pulley 16 and mirror 5 will rotate at approximately one-half the angular velocity of pulley 18 and of camera 1. Whenever this "2 to 1" relationship exists between the diameter of the pulleys 16 and 18, the second focus $F_2$ will effectively be removed to infinity. In contradistinction therewith, whenever the pulley ratio for the subject construction becomes less than the specified 2 to 1 value, the second focus $F_2$ is effectively brought to any desired and selectable finite distance from the first focus $F_1$ as determined by the selected ratio of pulley diameters. Thus, in this form of simplified arrangement, the axis of the camera supporting pulley 18 should be located at or in the close vicinity of the first focus $F_1$ and the axis of rotation of the larger pulley 16 should be located in the vicinity of a point P below the elliptic axis MA. The optimum position of the point P relative to the first focus $F_1$ and to axis MA and the length of link member 17 may be determined by empirical or mathematical means with the object always being to cause the point $Q_n$ on the mirror 5 to traverse a circular path 2b over the distance $Q_1Q_2$ that is a close approximation to an ideal elliptical path 2 by means of a motor 19 coupled, as at 20, to the pulley 16. The camera 1 may, in fact, be optically displaced any desired angular amount A relative to the center of interest 3 of the subject area 4 while the camera is used to expose the film contained therein.

The construction of FIGS. 1 to 3 permits the construction of relatively simple camera systems for fixed and portable use that are possessed of distinct advantages. One of these is the avoidance of the inherent limitation of the depth of focus in snapshot type relief cameras which must make use of large aperture lenses which have undesirably long focal lengths, even at $f$/numbers of 1.5 to 2.5 in order to obtain relief base angles A of adequate size. In the described system the relief base distance, that is, the angle A multiplied by the camera subject distance $F_1Q_nF_2$, may be extended to any desired distance greater than the lens aperture so that the relief effect covers any desired angle A sufficient to provide adequate relief effects. Also, by utilization of small cameras of the type conventionally employed in two dimensional non-relief photography and which have focal lengths more nearly comparable to that of the human eye in the discribed system, the depth of focus may be increased to the limits of such lenses. A second advantage is the automatic image inversion effected by the mirror 5 to produce correctly oriented top-side-up and right-side-right images when the film is viewed from the emulsion side. Thus the mirror 5 not only serves to provide a normal relief image that is correctly oriented but also functions as a traversing element to provide any desired relief base regardless of the small size of the camera 1 and its lens 1a. A third advantage is the minimization, if not effective avoidance, of inertial problems normally attendant conventional techniques wherein the subject is moved or the camera is moved a substantial distance.

For applications where displacement of the camera 1 cannot be tolerated (or is not desired) the modified construction illustrated in FIG. 4 may be employed. As there illustrated, the camera 1 is fixed in position and a second or auxiliary mirror 35 is optically interposed between the first mirror 5 and the camera lens 1a. The mirror 35 is located at the first focus $F_1$ and is rotatably displaceable so as to properly reflect the light rays into the camera during the traverse of mirror 5 from $Q_1$ to $Q_2$. However, since the inclusion of the auxiliary mirror 35 will again reverse the over-all image and thus nullify the single image reversal effected by the mirror 5, it may be desirable, in some systems, to add a third mirror 37 between the camera lens 1a and the relief film sub-assembly 39 comprising a multi-element lens overlay disposed closely adjacent to a photosensitive film. It is to be noted that when the FIG. 3 simplification is to be used the pulleys 16 and 18 must be of substantially the same size when mirror 35 is attached to pulley 18 if it is desired to locate the center of interest 3 effectively at infinity. When the center of interest 3 is to be at finite distance the pulley 16 must be smaller than pulley 18.

FIG. 5 illustrates the essentials of an improved photosensitive film construction employable, in accordance with the principles of this invention, in relief cameras. Referring thereto, there is provided a lenticulated element in the nature of a transparent multi-element cylindrical lens overlay 40 having a photosensitive layer comprising a plurality, as for example five, component layers a, b, c, d and e disposed in superposed relation upon the optically flat undersurface thereof to compositely form an overall emulsion layer 44. The component layers or resultant photosensitive coating is laid on the undersurface 42 in the reverse of the usual order employed with conventional film since they are progressively exposed to incident light 41 after it has been passed through the basal overlay 40. The emulsion layers are illustrated solely in diagrammatic fashion and in arbitrary number and in arbitrary enlarged dimension. The number and character of such layers will be determined, apart from this reverse orientation, by the factors normally determinative thereof in conventional film. These component layers may be of the self-developing type or may be of conventional compositions. The lens overlay 40 is made of transparent material of enduring character since the same serves as the basal substrate for the film during and after processing thereof and for permanent use.

After processing the film combination shown in FIG. 5 as a monochrome positive or negative, or as a color transparency the developed unit may be readily and directly viewed, by transmission or by reflection, as a three dimensional photograph by means of its inherent lens overlay elements 40n. As shown in FIG. 6, the processed film 40a may be conveniently illuminated by light rays 43 impinging upon an adjacent diffusing or reflective backing screen 45. Using left and right eyes L and R, three dimensional image points at L and R must be seen, respectively. If camera systems of the type shown in the figures are used correctly, these points L and R will correspond to normal left and right eye views of the subject while the over-all format is right-side-right and top-side-up. The correct relationship between relief data points, the over-all format and the viewer's eyes must be provided in each type of relief camera used. For example, in a camera of the type in which the film and multiple element lens array is tilted as an assembly about a vertical axis perpendicular to axis X—X while effective relative motion occurs between the subject and camera, both the camera and the film-lens array assembly must be rotated in the same direction while the mirror 5 is moved as previously described relative to the rotation of the camera. In a camera of the type described in my copending application, Ser. No. 649,310, filed June 27, 1967, wherein the camera aperture 95 in FIG. 10 is horizontally scanned by a sub-aperture while effective relative motion occurs between the subject and camera axis X—X in a direction having effective rotation relative to camera axis X—X that is opposite to the direction of rotation of the camera while mirror 5 is moved as previously described relative to the rotation of the camera. Neither of the above constructions are described or shown in detail in FIGS. 4 or 10 since they do not contribute to an understanding of the essence of the subject invention and would only complicate the description thereof.

The relief photograph 40a will thus constitute a normal relief image in all respects. When other cameras are used which do not utilize an inverting mirror 5 the image will be upside-down and must be corrected by means of a plane mirror or other suitable image-inverting means when film of the type shown in FIG. 5 is used.

In a multiple lens-photosensitive emulsion unit of the type described and shown in FIG. 5, the radii of the lenticulations 40n and the refractive index of the transparent base material 40 must be chosen so that substantially parallel incident rays 41 are focussed upon the film emulsion 44 by lenticulations 40n. This optical focal condition will also insure that when the overall three dimensional image is later viewed, as illustrated in FIG. 6, from distances that are normally large compared with the thickness of lenticulated base 40, the relief image will be seen to advantage.

It is usually desirable to have the focal length of lenticulations 40n relatively short or comparable with the width thereof. That is, the $f$/number of the lenticulations 40n should be low for most three-dimensional viewing or three-dimensional read-out purposes at short distances. An $f$/number as low as 1.5 has been found to be well-suited for normal viewing within arms' length distances. This value of the lenticulation $f$/number will yield one excellent central three-dimensional view normal to the plane of the photograph and one somewhat less satisfactory secondary three-dimensional view on either side of the desired central or "best" three-dimensional view. For more distant three-dimensional viewing higher $f$/numbers, which provide several three dimensional views (or cycles) near the normal to the plane of the photograph are usually preferable.

It should be understood, in the practice of this invention, that the lenticulations applied to the basal substrate 40 may be either substantially cylindrical or substantially spherical in form, the spherical form yielding three dimensional or relief effects in the vertical as well as the usual horizontal direction. However, when desired, aspheric curves may be employed in both the cylindrical and spherical types to eliminate spherical abberations. In some cases it may be found that it is desirable to have the focal plane of lenses 40n fall somewhat below surface 42.

When three dimensional photographs utilizing special transparent lenticulated elements as the basal substrate are employed as described above and are processed and viewed, the focal lengths of the particular lenticulations incorporated on the film may not be the optimum for both photographic exposure and for subsequent viewing. Such possible difference arises due to the fact that the lenticulations for close viewing preferably should have low $f$/numbers, for example, in the order of $f/1$ to $f/2$, while in contradistinction thereto and for reasons relating to the design of three dimensional cameras, the lenticulations should usually be $f/3$ or higher during photographic exposure. In order to provide for near optimum accommodation of both the above, this invention includes means for changing film lenticulations after photographic exposure to a lower $f$/number, or to a higher $f$/number if ever desired.

Referring now to FIG. 7, a typical lenticulated film formed in accordance with the teachings of this invention and consisting of a transparent lenticulated basal substrate 50 with a multi-layer emulsion coating 44 on the undersurface thereof is provided with lenticulations 54 shaped to provide (when auxiliary transparent element 56 not present) a low f/number.

An auxiliary overlay element 56 is disposed in overlaying intimate interfacial relation with the lenticulated surface 54 in such manner as to negate any refractions of light rays passing through the interface therebetween. The exposed surface of the overlay 56 is provided with lenticulations 58. Thus, with element 56 attached to the base element 50, the lenticulations 54 have substantially no focusing power and the lenticulations 58 of the auxiliary element 56 function to provide a higher f/number by virtue of their greater distance from the photosensitive emulsion 52 and by virtue of their longer curvature radii. The lenticular elements 58 must, of course, have the same widths as the lenticular elements 54 and must also be situated with their optical axes coincident with those of lens elements 54. Overlay elements 50 and 56 can, therefore, be used conjointly while a three dimensional photograph is exposed. Then after processing, the auxiliary overlay element 56 may be peeled away from the base element 50 so that the processed photograph may be viewed to the best advantage as a three dimensional image using only the lens overlay 50 having lenticulations 54 of a lower f/number, as are preferable for close viewing. The resulting thinner construction of the element 50 also permits a desirable increase in flexibility for handling purposes.

For practical purposes, the auxiliary overlay element 56 may be attached to the base element 50 by any suitable transparent adhesive which does not detrimentally effect the optical quality of the lenticulations 54 before and after peel-off of the auxiliary element 56. If necessary, the application to lens surfaces 54 of a thin layer of a material to which the adhesive is less attracted than to the facing surfaces of the auxiliary overlay element 56 will insure that all the adhesive remains attached to element 56 after its peel-off.

Generally, however, the use of high blocking type films having the capacity of detachably adhering to itself or to other materials, as the lenticulated base 50 and peelable element 56 will be preferred. Such "blocking" characteristics are readily incorporatable into cellulose acetate film (such as are commercially employed as bases for conventional films) and other plastic film by the introduction of, for example, suitable plasticizing agents therein, as is well known to those skilled in the plastics art.

In film of the type illustrated in FIG. 7, the placement of all the lens elements 54 and 58 in respective coaxial relationship with each other will, in most cases be satisfactory. However, in some systems it may be desired to utilize lens elements 54 that are slighty narrower or wider than lens elements 58. In such a variant, those lens elements 54 and 58 that are located on the optical axis X—X of the camera should be disposed in coaxial alignment with the progressive degree of net differential departure increasing with the difference therefrom. The operational effect of such dissimilar sizing of the individual lens elements may also be obtained through utilization of an auxiliary collimating lens disposed closely adjacent to the lens elements 58. Use of such a collimating lens is disclosed and described in my copending application Ser. No. 649,308, filed June 27, 1967, in conjunction with a different but related object.

The FIG. 8 construction illustrates an arrangement wherein elements 50 and 56 need not be actually in a good condition of peelable adherence to each other. When desired, the elements 50 and 56 may be held together by a common edge clamp frame 90 which holds a transparent clamping plate 91 in contact with lenticulations 58 of element 56 and a backing plate 64 in contact with the emulsion side 44 of element 50. If element 56 is precurved slightly so that its center lenticulations first contact the center lenticulations of element 50 then plate 91 may be omitted if desired.

In some cases it may be desirable to utilize a sub-assembly comprising a flat film base having an inverse order multilayer film emulsion designed for exposure from within the film base disposed thereon. Such an inverse type film could then be fastened to a variety of different lens arrays as required for use in various types of relief apparatus. FIG. 9, shows such an inverse type photosensitive emulsion 44 attached to one side of a flat base 59, the opposite flat side of which might be fastened by a suitable adhesive to the optically flat undersurface 45a of a lens array 45 having lens elements 45n on its other surface. When desired, elements 59 and 45 might also be held together by an edge clamp 90, with or without backing plates 64 and 91 in the same manner as in the assembly shown in FIG. 8. Similarly, a dual lens array similar to arrays 50 and 56 might be attached or used with inverse emulsion 44 on a flat base 59.

As will now be apparent, one of the principal advantages of the improved film construction of this invention is that perfect duplication of registry of the viewing lenticulations with those used for photographic exposure is assured after processing of the photosensitive emulsion since the emulsion and lens overlay always remain permanently attached to each other. In addition, the use of dual lenticulations will permit utilization of optimum optical characteristics for both photographic exposure and viewing. Additionally, incorporatiion therein of self-processing means for developing the exposd film would render relief photographs immediately available.

Incorporation of the above-described composite lenticulated film constructions of FIGS. 5 to 9 in the heretofore described camera systems illustrated in FIGS. 1, 2, 3, 4 and 10 readily permits the formation of a highly-practical, readily-portable and particularly useful camera system that is particularly adapted for home, commercial or field use. Such a system is schematically illustrated in FIG. 10 wherein all of the operative camera components are included with a housing 97 indicated by the dotted lines which is sized and adapted to be hand-held or tripod mounted for use. As will be apparent from the drawing, the housing 97 contains a camera 1 so mounted that the camera axis X—X is adapted to be rotated about a vertical axis passing through a first focus $F_1$ of an ellipse, conjointly with the displacement of a plane mirror element 5 through a predetermined arc 2c about a point P, as previously described, so that the centre area 3 of a subject of interest located at the second focus $F_2$ is progressively viewed from various angles throughout the range of angle A. Photographic exposure of an emulsion layer 44 through an overlying lenticulated base 40 having lens elements 40n on the exposed surface thereof (or through a lenticulated base compositely formed of a base element 50 and separable element 56 as illustrated in FIG. 7) is effected by a simultaneous uniform displacement of a sub-portion of the aperture 95 of the camera lens 1a in its stop plane 96 conjointly with displacement of the camera 1 and mirror 5, so that angle A is effectively traversed by the optical extension of axis X—X at substantially uniform velocity. As illustrated, the composite lenticulated film is preferably disposed within a roll film pack 92 containing unwind and rewind spools 93 and 94. Those spools may, where desired alternatively be disposed at 90° to the directions shown in FIG. 10, in which construction the film lenticulations are parallel with the length of the film, rather than perpendicular as shown in FIG. 10.

It will now be apparent that use of the herein described camera film constructions makes practically feasible a simple, compact, portable and relatively inexpensive camera system for the taking of relief photographs for both the amateur and professional photographer.

Having thus described my invention, I claim:
1. A photosensitive film construction comprising
a base member having an under surface coated with photosensitive emulsion and an upper surface contoured to provide a first set of lenticulations thereon selectively shaped to project images stored on said photosensitive emulsion for viewing purposes, a separable multi-element lens overaly having an under surface removably disposed in intimate continuous interfacial relation with the lenticulated upper surface of said base member to provide a substantially zero differential refractivity at the interface, said multi-element lens overlay having an upper surface selectively contoured to provide a second set of lenticulations for focusing images of distant objects on said photosensitive emulsion through said interface.

2. The film construction as set forth in claim 1 wherein said photosensitive emulsion comprises a plurality of layers of differing character selectively capable of photosensitive response.

3. A photosensitive film construction as set forth in claim 1 wherein each of said first and second sets of lenticulations comprises a plurality of discrete lens elements individually paired in complemental optical coaxial relation.

References Cited

UNITED STATES PATENTS

| 1,707,157 | 3/1929 | Berthon | 96—81 |
| 2,158,174 | 5/1939 | Capstaff | 96—81 |
| 2,981,941 | 4/1961 | Ogle | 350—167 |
| 3,099,195 | 7/1963 | Goodbar | 350—167 XR |
| 3,213,753 | 10/1965 | Rogers | 350—167 XR |

FOREIGN PATENTS 274,837   1/1928   Great Britain.

DAVID KLEIN, Primary Examiner

U.S. Cl. X.R.

352—58; 350—167; 96—26